United States Patent [19]

Westphal

[11] Patent Number: 4,692,626
[45] Date of Patent: Sep. 8, 1987

[54] NUCLEAR AND X-RAY SPECTROMETRY AND LOW-PASS FILTER AND FILTERING METHOD THEREFOR

[76] Inventor: Georg P. Westphal, Schmidlergasse 7, A-1238 Wien, Austria

[21] Appl. No.: 747,137

[22] Filed: Jun. 20, 1985

[30] Foreign Application Priority Data

Jun. 20, 1984 [AT] Austria ................................. 2021/84
Feb. 15, 1985 [AT] Austria ................................... 454/85

[51] Int. Cl.[4] ................................................ G01T 1/17
[52] U.S. Cl. .................................... 250/389; 250/370; 250/374; 250/395; 364/527; 364/572
[58] Field of Search ............... 250/374, 375, 388, 389, 250/395, 370 E; 364/486, 572, 527

[56] References Cited

U.S. PATENT DOCUMENTS 3,321,628  5/1967  Webb ................................. 250/374
3,872,287  3/1975  Koeman ............................. 364/527
4,476,384 10/1984  Westphal ......................... 250/252.1

FOREIGN PATENT DOCUMENTS 3132479  3/1983  Fed. Rep. of Germany .
3301792  8/1983  Fed. Rep. of Germany .
3301656  9/1983  Fed. Rep. of Germany .
  11785  1/1979  Japan .................................... 250/388
2081543  2/1982  United Kingdom .
2116388  9/1983  United Kingdom .

OTHER PUBLICATIONS

M. Bertolaccini, C. Bussolati, S. Cova, I. DeLotto and E. Gatti, "Optimum Processing for Amplitude Distribution Evaluation of a Sequence of Randomly Spaced Pulses", *Nuclear Instruments and Methods*, vol. 61, (1968), pp. 84–88.

Nuclear Instruments and Methods 100, (1972), pp. 493–504, North-Holland Publishing Co., "Pulse-Shaping in Low-Noise Nuclear Amplifiers: A Physical Approach to Noise Analysis", F. S. Goulding.

*Primary Examiner*—Janice A. Howell
*Assistant Examiner*—Constantine Hannaher
*Attorney, Agent, or Firm*—Karl F. Ross; Herbert Dubno

[57] ABSTRACT

Pulse pile-up rejection in nuclear and X-ray spectrometry is reduced or eliminated by providing the low-pass filter with a storage element which is charged to the value substantially by the voltage step generated by a quantum of radiation before the filtering process commences and only then effecting the filtering process. The step values before and after the rise of the step can be detected and with storage of the previous value, the energy proportional output can then be detected as the difference. The method and apparatus eliminates the rise time of the storage element as a factor contributing to pulse pile-up.

12 Claims, 18 Drawing Figures

NUCLEAR AND X-RAY SPECTROMETRY AND LOW-PASS FILTER AND FILTERING METHOD THEREFOR

FIELD OF THE INVENTION

My present invention relates to nuclear and x-ray spectrometry and to a low-pass filter circuit therefor. More particularly, the invention relates to the improvement in the resolution of such spectrometry and specifically to a method of processing the signals from the low-pass filter or in the low-pass filter such that pulse-pileup is avoided.

BACKGROUND OF THE INVENTION

Energy spectrometry, e.g. nuclear and x-ray spectrometry evaluates a nuclear or x-ray flux by the collection of electric charges released in a detector by ionization of the detector material by the quanta of nuclear and x-ray radiation entering this material. The liberated electric charge is proportional to the energy of the radiation quanta absorbed in the detector.

The liberated charge is transformed by a charge-responsive preamplifier into a charge-proportional or energy-proportional voltage step which is subjected to filtering in a low-pass filter to reduce the electronic noise contributed to the signal by the preamplifier. The filter can be of the analog of digital type.

Spectrometry of this kind is the subject of my U.S. Pat. No. 4,476,384 and reference may be had also to the publications cited in the file of that patent (see also M. Bertolaccini et al: *Nuclear Instruments and Methods* 61 (1968) pages 84 ff; GP Westphal: *Nuclear Instruments and Methods* 138 (1976) pages 467 ff and 163 (1979) pages 189 ff; N Taccetti: *Nuclear Instruments and Methods* 225 (1984) pages 118 ff).

In United Kingdom patent publication No. 2,116,388A, there is disclosed a variable circuit characteristic which can be incorporated possibly as a filter characteristic and in which the switch is controlled with a signal having a variable keying ratio and which either passes or blocks the selected components of the signal. This allows a stepped or continuous control of a filtering process. The switch controlling signal in this case is generally not related to the signal to be filtered but must have a higher frequency than the latter.

U.K. patent publication No. 2,081,543A describes a commutated resistance circuit in which the control is effected generally in the same manner as in U.K. No. 2,116,388A, i.e. the control is by means of a control signal with a continuously variable keying ratio. The control signal generates a continuously variable intermediate value between two resistances. The higher frequency-control frequency of the switch is suppressed by means of a condenser.

The German patent publication DE No. 3,132,479A1 discloses a N-path filter in which the switch is controlled by three to N temporally overlapping phases. The German patent document DE No. 3,301,792A1 shows a switched condenser chain with reduced capacity in which, from a filtering input signal, a filtering output signal is generated by sampling at a predetermined sampling rate. This is effected by a condenser, a reversing or switchover circuit and an integrating circuit.

German patent document DE No. 3 301 656 discloses an arrangement for simulating electrical components.

It is common to all three of these German patent documents that the filter characteristic, especially the cutoff frequency, is determined by the respective circuit arrangement or can be varied by changing the control frequency.

To further improve the signal-to-noise ratio of the measurement in spectrometry of the class described, it is essential to reduce the electronic noise of the preamplifier and it is for this reason that a bandwidth limitation must be introduced by a suitable low-pass filter. At the same time a shortening of the duration of the voltage steps by electronic differentiation is required to avoid overlap of the steps and should be able to process a sufficient number of successive events in unit time.

By differentiation and multiple low-pass filtering of the voltage steps, signals of a quasi constant semi-Gaussian shape and of a variable amplitude are produced, the amplitude being proportional to charge and energy. This is the most representative example of nuclear pulse shaping.

A drawback of the conventional pulse shaping approach is the fixed duration of the filtering process of a single event which is determined by the filters step response. Signals with a closer spacing than the filters step response stack up and their amplitude information is lost. This phenomenon, also described below, is termed pulse-pileup.

The pulse-pileup phenomenon is the greatest obstacle in the processing of high counting rates and the most common approach in the past has been to use a filter with a short space response and consequently less efficient noise reduction or to limit the counting rate where high noise reduction is required.

Significantly better results have been achieved recently by a switched integration technique. In this case, the desired low-pass effect is obtained by the combination of a semi-Gaussian filter of comparatively short duration and the switched integrator to which it is connected.

The output of this system is comparable to the rising flank of a conventional semi-Gaussian filter. It however turns immediately downwardly towards zero by contrast with the characteristic of the semi-Gaussian filter upon discharge of the integrator and thus is free to respond promptly to subsequent signals.

The disadvantage of all heretofore known filter techniques is that the instantaneous value of the filter output builds up from a starting value of zero continuously to the energy-proportional final value which requires the aforementioned certain fixed duration for the filters response. It is this which causes the pulse-pileup upon the detection of signals with shorter spacing than the recovery time of the filter.

Thus, where pulse-pileup occurred with earlier filters, the additional pulses, although detected, were subjected to pulse-pileup rejection, i.e. were nonacknowledged events.

This has been the problem especially for signal or event trains which an exponentially shorter interval between events with increasing counting rates as is the case for measurements of radiation from radioactive wastes, and in other nuclear or x-ray spectrometry applications in which with increasing counting rates there is an increasing count loss.

OBJECTS OF THE INVENTION

It is the principal object of the present invention to provide an improved method of measuring energy of quanta of nuclear and/or x-ray radiation in which the disadvantages of earlier methods are obviated.

Another object of the invention is to improve the response time of a filter used in such spectrometry, i.e. to provide a filter method in which pulse-pileup rejection is minimized or reduced.

It is a further object of my invention to provide an improved apparatus for the purposes described.

SUMMARY OF THE INVENTION

These objects and others which will become apparent hereinafter are attained, in accordance with the invention in a method which comprises detecting a sequence of events represented by quanta of nuclear and x-ray radiation by liberating electrical charge with the quanta and converting the charge measurements into voltage steps proportional to the charge and therefore the energy of the quanta via a charge-sensitive preamplifier, subjecting the output of the preamplifier to low-pass filtration in a low-pass filter having a storage element to reduce the electronic noise of the preamplifier and generating an output representing the measured energy, the low-pass filter having an analog or digital configuration.

According to the invention, the storage element of the low-pass filter before beginning the measurement of the voltage step of a quanta is brought to an intial voltage value corresponding to the unfiltered value of the voltage step of the quantum, the measurement of the energy of the quantum is determined no later than the arrival of the next quantum, the energy proportional noise reduced voltage step (B−A) is determined by intermediate storage of the filter output value (A) immediately before beginning of the quantum measurement process and by the formation of the difference between this filter output value A directly before beginning the measuring process and the filtering output value (B) directly after termination of the measuring process.

A further feature of the invention is that the difference formation between the filter output value (A) directly before a quantum measurement of the filter output value (B) directly after the termination of the measuring process (B) is carried out in two parallel and identically operating paths or channels, in one of these paths, the filter output value (A) being stored temporarily while in the other of these paths the difference value B−A is formed and vice versa with the results (B−A) being derived from the two paths alternately.

In other words I am able to minimize pulse-pileup losses and to optimize the use of pulse spacing for noise reduction wherein the delta-noise filtering of the preamplifier noise is carried out by means of a low-pass filter operating directly upon the voltage steps of the preamplifier or upon a suitably preprocessed replica of the voltage steps of the preamplifier.

According to the invention, the noise averaging storage element of the filter, i.e. a capacitor in the case of an analog filter or an accumulator in the case of a digital filter, is rapidly preloaded to the step amplitude before initiating the filter process.

In this manner I am able to reduce or eliminate completely the time which was hitherto required for the slow-charging phase from zero to the step amplitude necessary as a precondition to conventional filter operation.

In other words the filter output at the start of the filtering process is brought to a value closed to the final value which may be the value when the filtering process is terminated at the latest before the arrival of the next event to avoid pulse-pileup losses.

It is true that the consequence of a shortened filtering period may be a less efficient noise reduction for the specific event, but the system automatically adapts to pulse spacing by rendering a higher resolution at lower counting rates and thus lower resolution at higher counting rates, behaving very similarly to the ideal system which was hypothesized by Bertolaccini et al., (op. cit.) in that it optimizes throughput and resolution at the same time.

The spectroscopic output value is the height of the noise-filter voltage step from the preamplifier which is determined as previously mentioned by sampling the filter output immediately before a step (at the value A) and subtracting it from the filter output at the termination of filtering as designated B.

I can also eliminate any effect of the slope of the preamplifier step, which may not be completely horizontal due to the integration of detector leakage current in the preamplifier by differentiating the original current through the detector to obtain delta-like pulses which represent the charge collection signals of the radiation events to be measured above a base representing the detector leakage current. By regulating to zero the baseline between pulses with a so-called gated baseline restorer which is gated off during pulse duration, the leakage current pedestal is eliminated and, by subsequent integration, replicas of the voltage steps are obtained which are free from the aforementioned slope or range and may be processed correctly by the preloaded filter.

Reset of the integrator can be effected synchronously to the corresponding reset pulse of the preamplifier or may be performed after each termination of a filtering period which reduces the dynamic range of the subsequent circuit.

According to the apparatus aspect of the invention, the apparatus comprises a detector, the preamplifier connected to the detector and a signal-recognition discriminator directly connected to the preamplifier and followed in turn by a control unit, a differentiating network and a low-pass filter with a delay line ahead of this low-pass filter. The latter can be formed by a resistor, a condenser and a high impedance amplifier and the resistor R1 can be bridged by an electronic switch S1 which is closed by the control unit during the rise of the voltage step to be measured and directly thereafter is opened.

The difference-forming unit is provided which can include a condenser C2 and a switch S2 and an electrometer amplifier EV1, the condenser C2 being charged through the closed switch S2 from the high impedance amplifier of the low-pass filter from ground potential to the filter output value (A) immediately before beginning of a quantum measurement. The switch S2 opens directly prior to the rise of the measured voltage step and closes again after termination of a quantum measurement. The condenser C2 of the switch S2 are connected to the electrometer amplifier EV1 to form the voltage (B−A) which in its amplified form is delivered at the output side of the apparatus.

According to a feature of the invention two identical difference-forming units are connected to the high impedance amplifier of the low-pass filter, each of these difference formers comprising a switch S2, S3, a condenser C2, C3 and an electrometer amplifier EV1, EV2 with the first switch S2 closing when the second switch S3 opens and visa versa so that the switches S2 and S3 change state directly before the arrival of the step pulses to be measured. The step pulses can be stored in respective storage (sample hold) units SH1, SH2 and can be treated in the balancing unit AE. They are applied to a switch S4 which is always connected with the output of one electrometer amplifier and hence one of the channels from which the actual filtered step difference (B−A) is derived.

BRIEF DESCRIPTION OF THE INVENTION

The above and other objects, features and advantages of the present invention will become more readily apparent from the following description, reference being made to the accompanying drawing, in which.

SPECIFIC DESCRIPTION

Figure 1A:
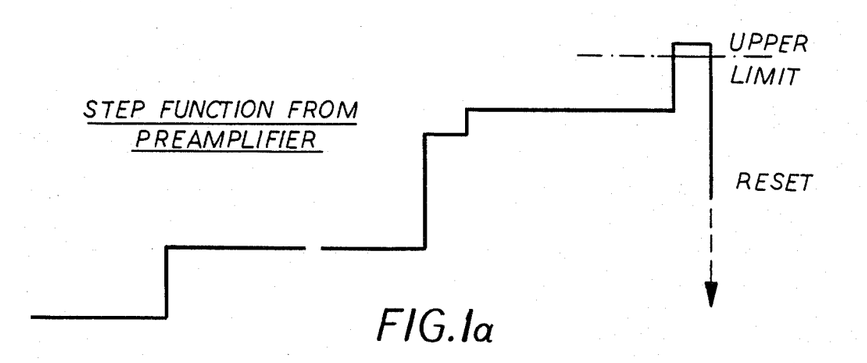
FIG. 1a is a graph showing the step function from a preamplifier.
Figure 1B:
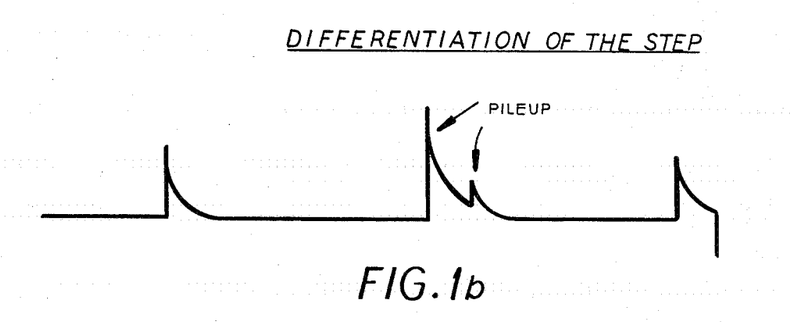
FIG. 1b is a waveform diagram showing the differentiation of the step.
Figure 1C:
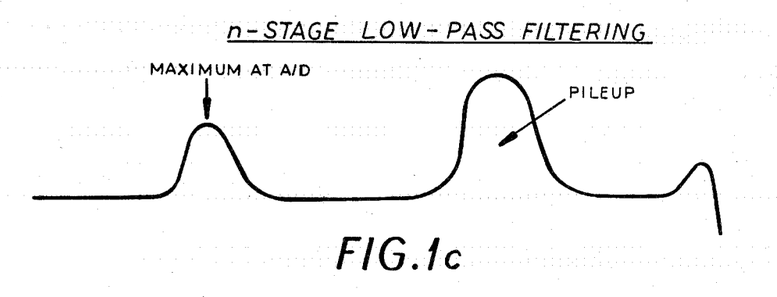
FIG. 1c is a waveform diagram showing the effect of n times low-pass filtration.

From FIG. 1a one can see the normal step function of a preamplifier receiving a number of pulses from a detector, each pulse being characterized by a sharp rise in the step function until the step function reaches its upper limit at which time the unit is reset and the measurement begins again. Differentiation of the step (FIG. 1b) shows the successive events as spikes and a pileup condition as described previously has also been illustrated. The output of an n stage low-pass filter has been shown in FIG. 1c and the energy pulse truly indicative of an event has been indicated by the maximum designated in this Figure while the pileup condition has also been shown. Basically the apparatus which provides this type of output has been shown in FIG. 1d in which the detector 101 is coupled to a preamplifier 102 shown to be of an analog type and followed in turn, by an RC network differentiator 103 whose operational amplifier 104 works into n low-pass filter stages 105a, 105b, 105c ..., each with its RC network and amplifier.

Figure 1D:
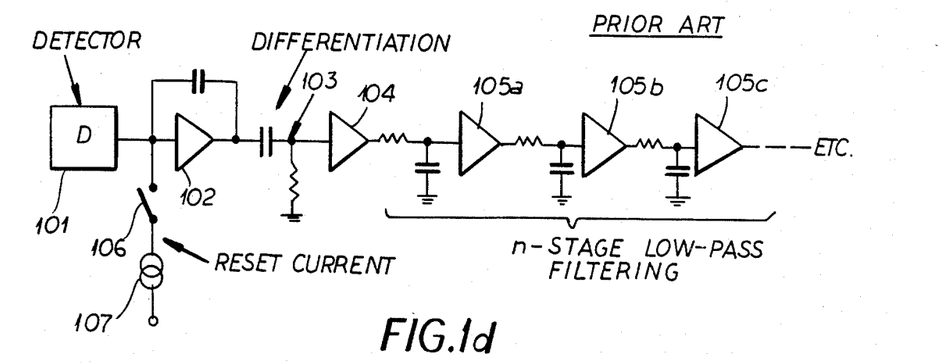
FIG. 1d is a block diagram of a circuit for obtaining the n stage low-pass filtration illustrated in FIG. 1c.

The preamplifier may be of a type which utilizes a switch 106 for resetting purposes, e.g. a transistor reset amplifier, which supplies a reset current from a source 107 to begin the operation anew.

One can immediately appreciate that in the foregoing Figures, the output is strongly sensitive to pulse pileup and does not discriminate significantly between events in the pileup region.

Figure 2:
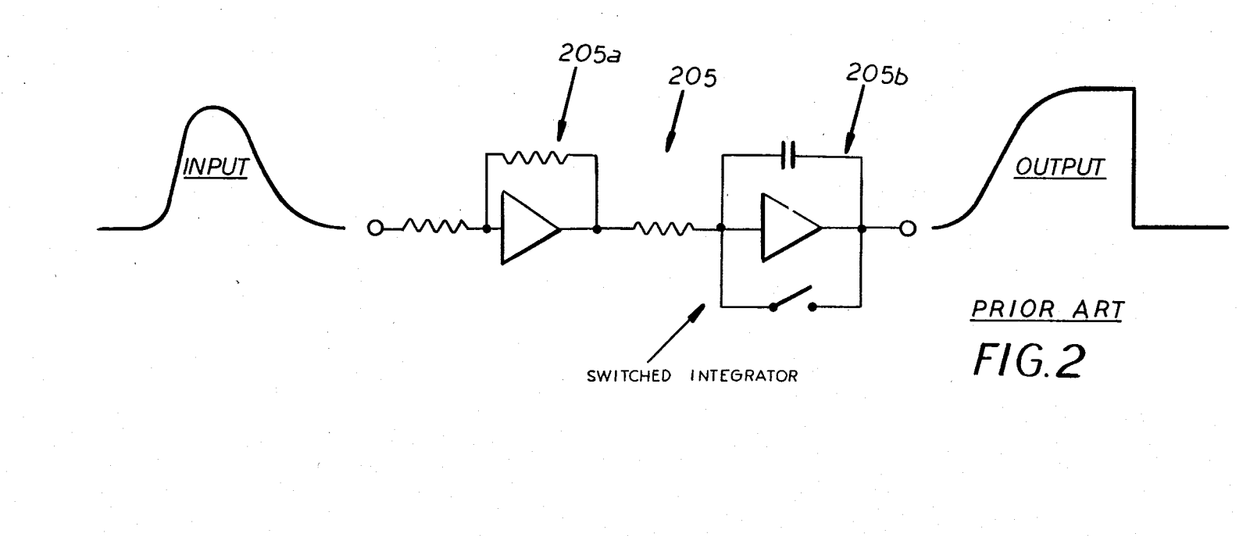
FIG. 2 is a circuit diagram of a switched integrator illustrating the principle thereof.

As has been noted previously, one of the ways to increase the resolution and thereby reduce the response time of the preamplifier is to provide the latter as a switched integrator unit as is illustrated in FIG. 2. Here the desired low-pass filtering effect utilizes a low-pass filter 205 which comprises a semi-Gaussian filter 205a followed by switched integrator 205b, the input and output waveforms of which have been shown. As is apparent from this Figure, the rising flank at the output corresponds to that of a conventional semi-Gaussian filter, i.e. to the pulses shown in FIG. 1c, while the descending flank can be brought practically instantaneously to zero, thereby freeing the unit to accept pulses which follow more closely on one another with a lesser degree of pulse pileup.

Figure 3:
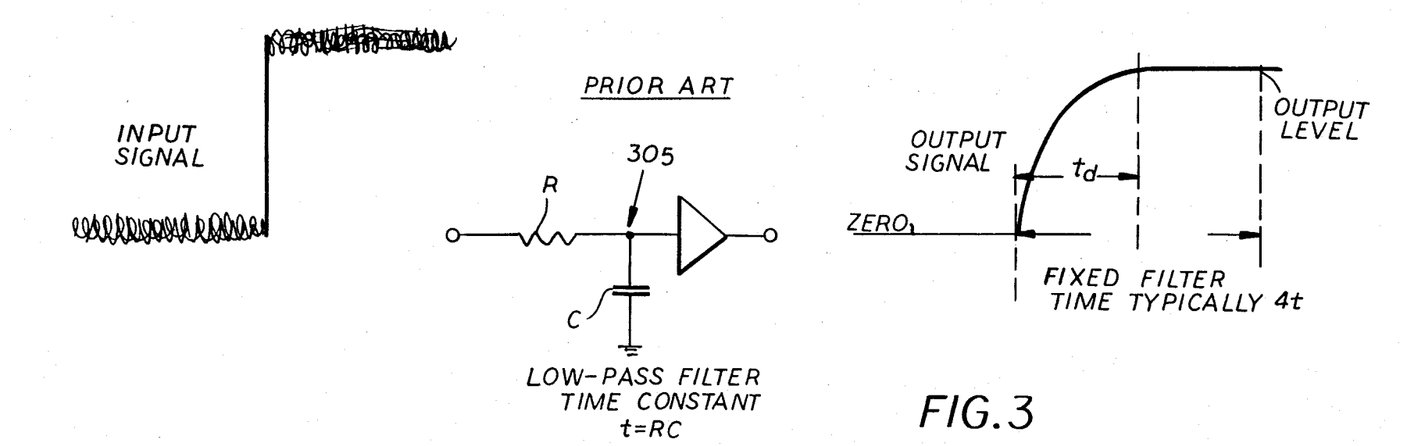
FIG. 3 is a circuit diagram with input and output waveforms illustrating the noise conditions before and after a conventional low-pass filter.

The noise effect on a conventional low-pass filter in its simplest form has been illustrated in FIG. 3 where the low-pass filter 305 is no different from any of the low-pass filters shown in FIG. 1d. The input signal has been represented, at the input side and the output signal has been represented at the output side and the most significant point to be drawn from this Figure is that the response has a fixed filter time because of the need to charge the storage element of the filter namely the capacitor from the zero level to the output level.

Figure 4:
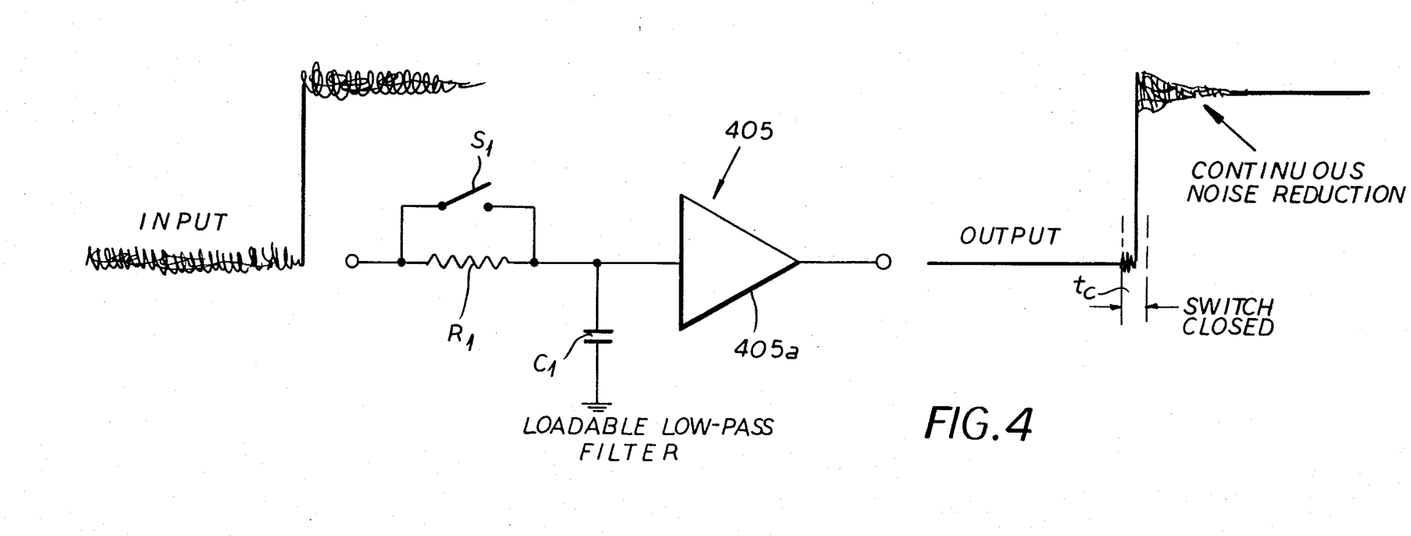
FIG. 4 is a diagram similar to FIG. 3 but showing the results obtained with a chargeable low-pass filter.

By contrast, the loadable low-pass filter shown in FIG. 4 and represented at 405 comprises a resistor R1 and a condenser C1 defining the time-constant network at the inlet side of the amplfier 405a, and electronic switch S1, e.g. a transistor switch, being provided to permit charging of the capacitor commencing prior to the arrival of the pulse event.

With the switch S1 closed, the condenser C1 can be promptly brought to the step height of the input so that the filter is initially charged with the maximum value of the unfiltered signal and the filtering process can then begin after opening of the switch S1.

Because of the progressive reduction of the width of the noise band, the filtered signal is easily read.

The period of approximately $t_d$ before the output level even approaches the level of the input step (compare FIG. 3) is entirely eliminated as a comparison of the wave forms of FIGS. 3 and 4 will show.

Apart from the noise reduction, however, the instant invention also requires the determination of a difference for each individual event between the step height corresponding to the instantaneous voltage value before and after a detector pulse. In conventional filters this is obtained as is clear from FIG. 1 by differentiating ahead of the low-pass filter to obtain a pulse whose height has predetermined relationship to the zero level as determined by the event.

Figure 5:
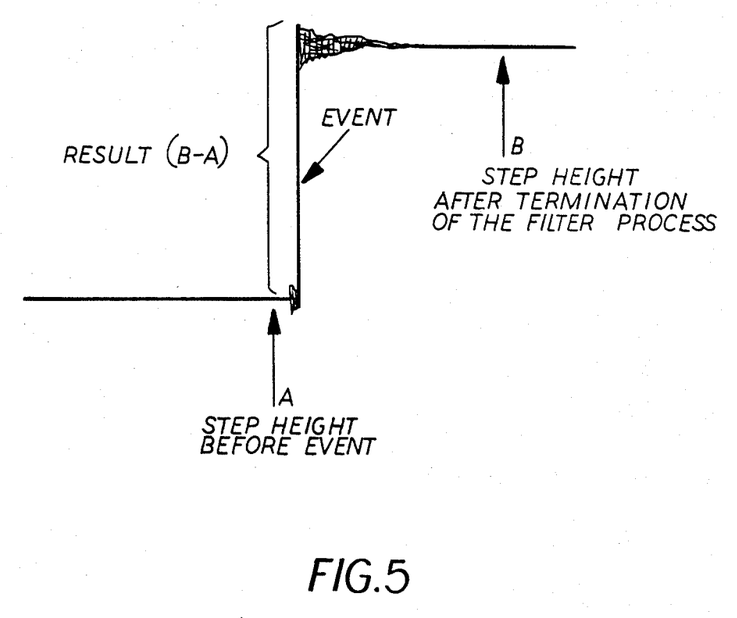
FIG. 5 is a graph showing the difference-forming operation for a given event.

A different approach is used with the instant invention as has been indicated in FIG. 5.

Here the result B−A is obtained by subtracting the step height A before the event from the step height or voltage value B after termination of the filter process. The timing of the event has also been shown in FIG. 5 in which time can be considered to be an abscissa value while the ordinate represents voltage amplitude.

Figure 6:
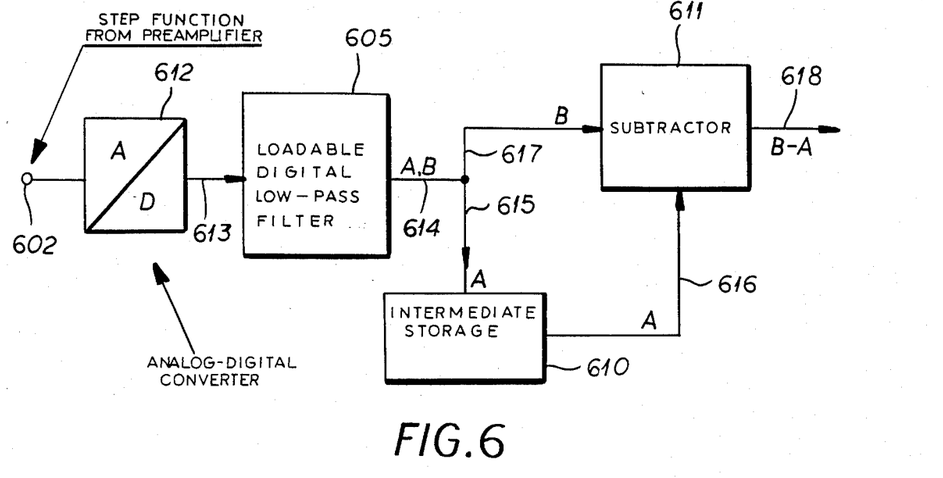
FIG. 6 is a block diagram of another difference-forming circuit utilizing an intermediate storage of a subtraction unit.

While the intermediate value of A can be obtained from the loadable low-pass filter, e.g. the digital low-pass filter 605 of FIG. 6 and held by intermediate storage in a memory 610, the subsequent value B can be passed directly to the substracting unit 611 in this circuit.

If a digital system is utilized, the output 602 from the preamplifier, e.g. the preamplifier or FIG. 1d, is applied to an analog-digital converter 612 whose digital output is applied at 613 to the loadable digital low-pass filter 605 outputting the values A and B at 614. The latter is connected at 615 to the intermediate storage 610 whose output 616 is applied to the subtracting unit 611 whose other input 617 derives from the output 614. The output 618 of the subtractor carries the difference value B−A.

If an analog filter system is used, an analog storage unit or a sample-hold circuit must be provided with an analog subtraction circuit.

Since the driving range of the preamplifier, i.e. the range within which no substantial distortion develops, is comparatively wide by comparison to the height of an individual step (greater than 100:1) conventional sample and hold units are satisfactory but may even by superfluous and the technique illustrated in the Figures subsequently described may be used.

Figure 7A:
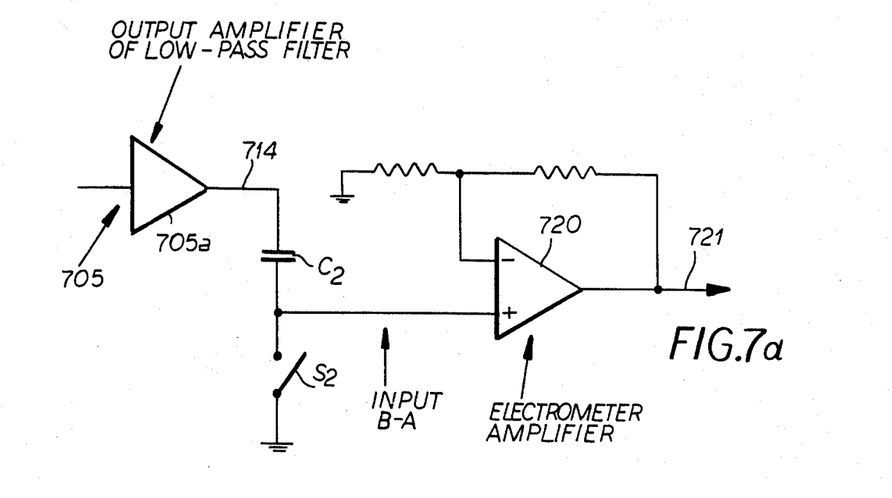
FIG. 7a is a block circuit diagram of the difference former of the instant invention.

For example, I may make use of the circuit shown in FIG. 7a to form the difference. In this case, the output 714 from the output amplifier 705a of the loadable low-pass filter 705 is connected to a condenser C2 which lie in series with a switch S2 and ground.

When the value A arrives at the capacitor with the switch S2 closed, the capacitor C2 is charged to the original value of the step A. The switch S2 opens directly before the next stage and consequently the value of the signal applied to the input of the electrometer amplifier EV1, here represented at 720, is of course the difference B−A which is amplified and delivered at 721.

After each evaluation of the difference, of course, the switch S2 must be opened to allow the capacitor C2 to charge to the new value A.

Figure 7B:
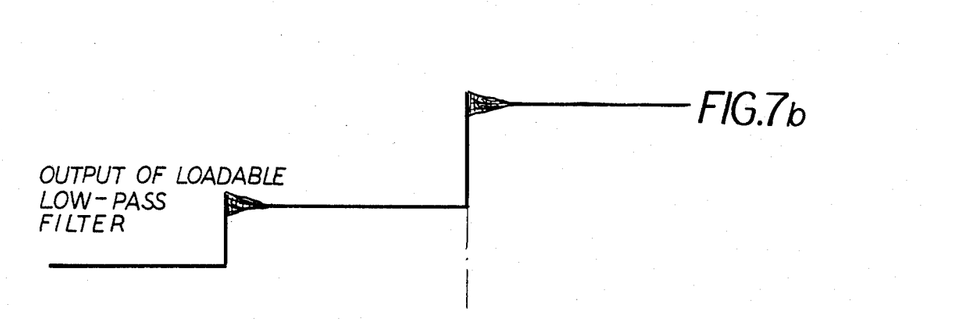
FIGS. 7b–7d are graphs illustrating the operation of the latter circuit.
Figure 7C:
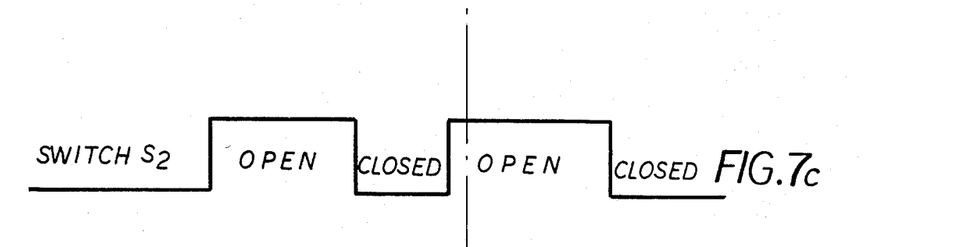
Figure 7D:
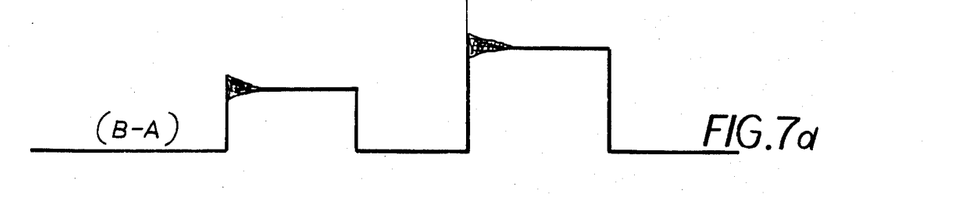

FIGS. 7b–7d show the signal levels and conditions at successive periods of time.

Figure 8:
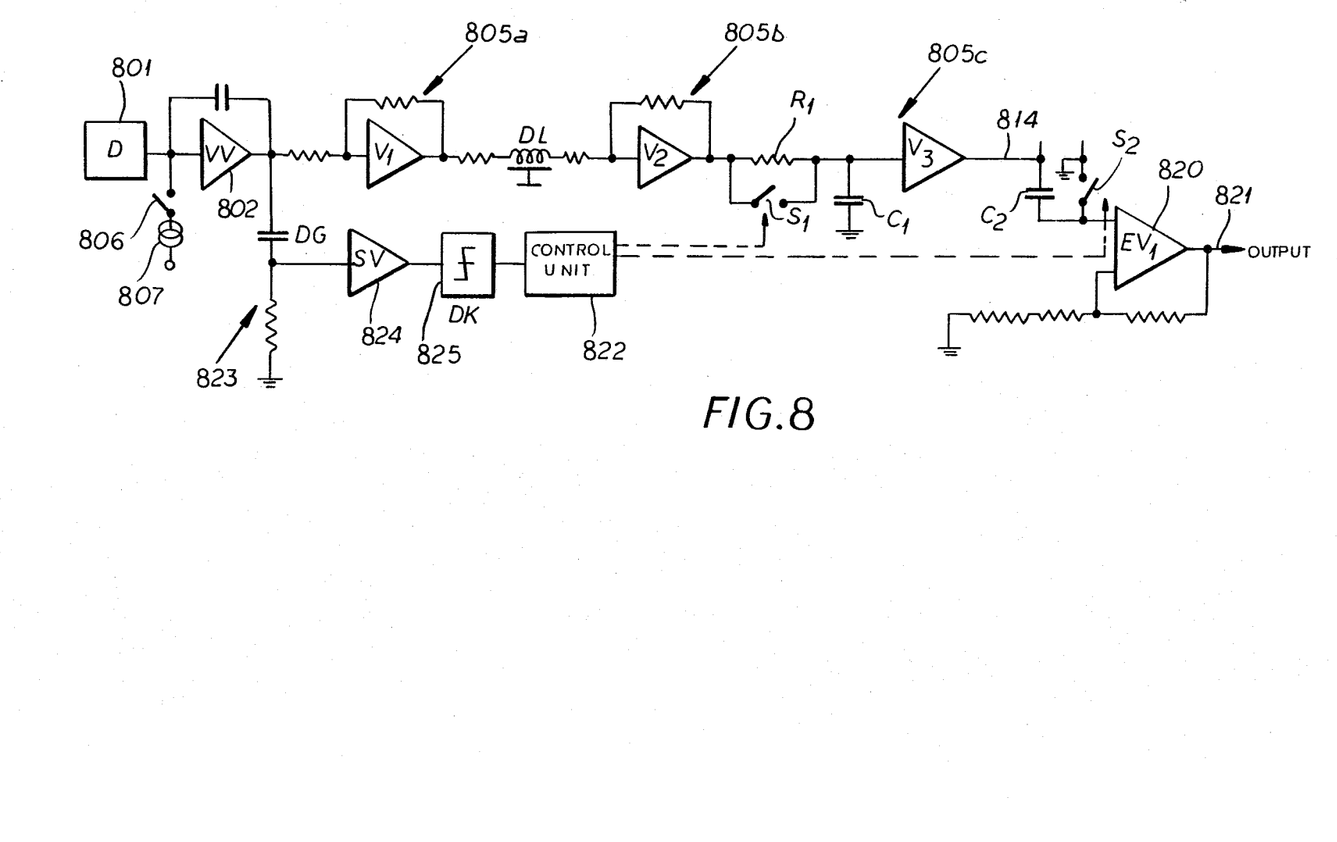
FIG. 8 shows a more elaborate construction of the spectrometry apparatus of the invention.

FIG. 8 represents a complete circuit for carrying out the invention and as can be seen, this circuit comprises the detector 801, a preamplifier 802 and the reset switch 806 and reset current source 807, all of which may correspond to the circuits previously described and which work as described into semi-Gaussian amplifier stages 805a and 805b which can be separated by a delay line DL.

The loadable low-pass filter is represented at 805c and includes the resistor R1 and switch S1 and capacitor C1. All as described specifically in connection with FIG. 4, the output of the amplifier of this low-pass filter being connected as represented via the line 814 to the capacitor C2 which can be grounded via the switch S2 as described in connection with FIG. 7a.

As is also described in this Figure, the B−A value is applied to the electrometer amplifier 820 and the output is found at 821.

This circuit also includes a control unit 822 for operating the switches S1 and S2 in the appropriate cadence in accordance with the arrival of each step as detected by a step detector 823 in the form of a differentiating circuit whose differentiating amplifier has been represented at 824. A discriminator 825 is provided between the step detector and the control unit 822.

No detailed description of FIG. 8 is required since the components operate in the manner which has previously been described, except that the timing is provided by the control unit.

Since the charging of condenser C2 does require a certain amount of time which may itself delay the response of the system and may cause a certain degree of pulse pileup, the circuits of 7a and 8 may be modified to provide two paths downstream of the output amplifier of the loadable low-pass filter.

Figure 9:
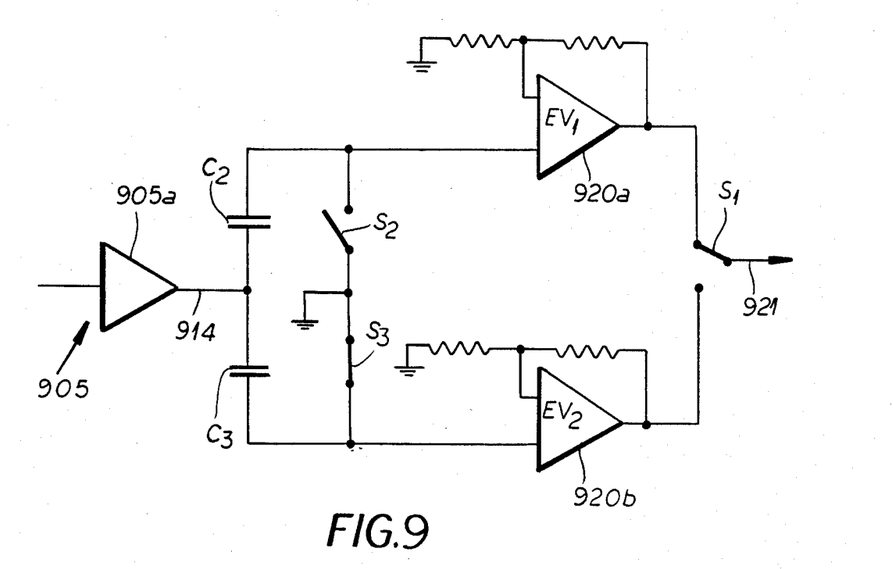
FIG. 9 shows a difference former with two alternately operating units.

Consequently, I have shown in FIG. 9 a low-pass filter 905 whose output amplifier 905a delivers its output 914 to identically operating paths or networks each comprising a condenser C2 and C3 and having a pair of switches S2 and S3 which are reversed in position alternately, these paths working into a pair of electrometer amplifiers 920a and 920b having a switch S4 commutated between paths and connected to the system output 921.

When the first switch S2 opens, the switch S3 closes and vice versa so that while one switch allows the formation of the difference B−A, the other switch is allowing the storage of the new value A in the other path. Of course the switches S2, S3 and S4 are all connected to the control unit in the manner previously described and are synchronized so that there is no delay due to capacitor charge time which may result in pulse pileup.

Figure 10:
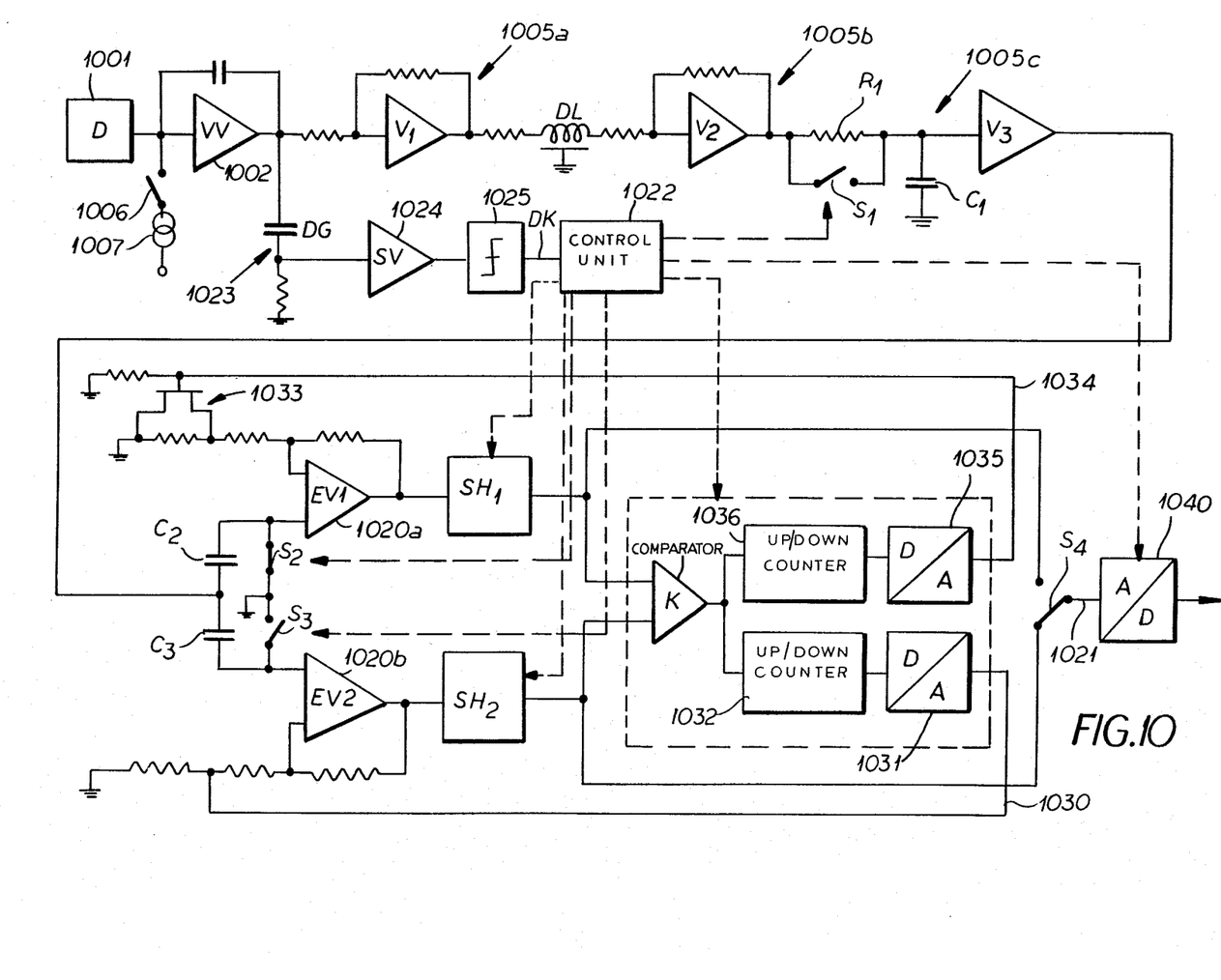
FIG. 10 illustrates, in block diagram form a nuclear or X-ray spectrometry circuit according to the invention.

FIG. 10 shows a more comprehensive circuit for carrying out the method of the invention.

The circuit elements in this Figure bearing the same reference numerals in the tens and units places as those of earlier Figures, of course, function identically thereto. Solid lines represent analog signal paths and broken lines control paths.

It may be noted that the relatively short time constant from the differentiating network 1012 applied to the high speed amplifier 1024 can result at the output DK of the discriminator 1025, logic pulses which coincide in time with the step pulses of the preamplifier and serve to key the control unit so that timing signals are outputted from the latter to close the various switches at the appropriate times.

The delay line DL ensures that the opening of the switch S1 will occur directly before the rise of the step pulse.

The amplifier V3 of the low-pass stage 1005C acts as voltage follower to drive the unit forming the difference as described in connection with FIG. 9.

The outputs of the electrometer amplifiers 1020a and 1020b are applied to the sample hold circuits SH1 and SH2 whose outputs are applied to a comparator K in a compensatory or equalizing unit AE which is also controlled by the controller 1022.

The alternately operating switches S2 and S3 change in position so that one opens and the other closes and vice versa directly before the rise of each step pulse. At each condenser C2, C3 as long as the respective switch is grounded, the charge represents the voltage level of the step function before the arrival of the new step. After opening of the switch, therefore, only the difference is registered and thus only successive differences between such functions can be found at the outputs of the electrometer amplifiers 1020a and 1020b.

These are applied to the sample-hold circuits SH1 and SH2 as step pulses of a level relative to ground potential which represents the energy of the measured radiation, i.e. filtered energy proportional step pulses without pileup.

With this system an increase of the counting rate or reduction in the count loss at high counting rates can represent a 50% improvement with a minimum of additional circuit elements. The zero points and amplifications of both channels, however, must be fully in agreement since the smallest deviations can destroy the advantages of the system.

A continuous monitoring of both the zero point setting and the amplification are required. To this end one channel is provided with a zero point correction feedback via the line 1030 from a digital-analog converter 1031 which is connected to an updown counter 1032 while the other channel is provided with a field effect transistor circuit 1033 for controlling the amplification thereof utilizing a feedback line 1034 from the digital-analog converter 1035 and the updown counter 1036. Both of the updown counters are connected to the comparator K which can compare signal levels to monitor any change in amplification or zero point setting.

The output of the switch S4 can be applied via the line 1021 to the high speed analog-digital converter 1040 which, for a 12 bit resolution has a converter time of 1.5 micro seconds and for a 14 bit resolution a converter time of 5 micro seconds.

The intermediate storage of the signal in the sample and hold units SH1 and SH2 make it possible to operate with shorter pulse intervals without count losses than are defined by the converter times of analog-digital units.

Figure 12:
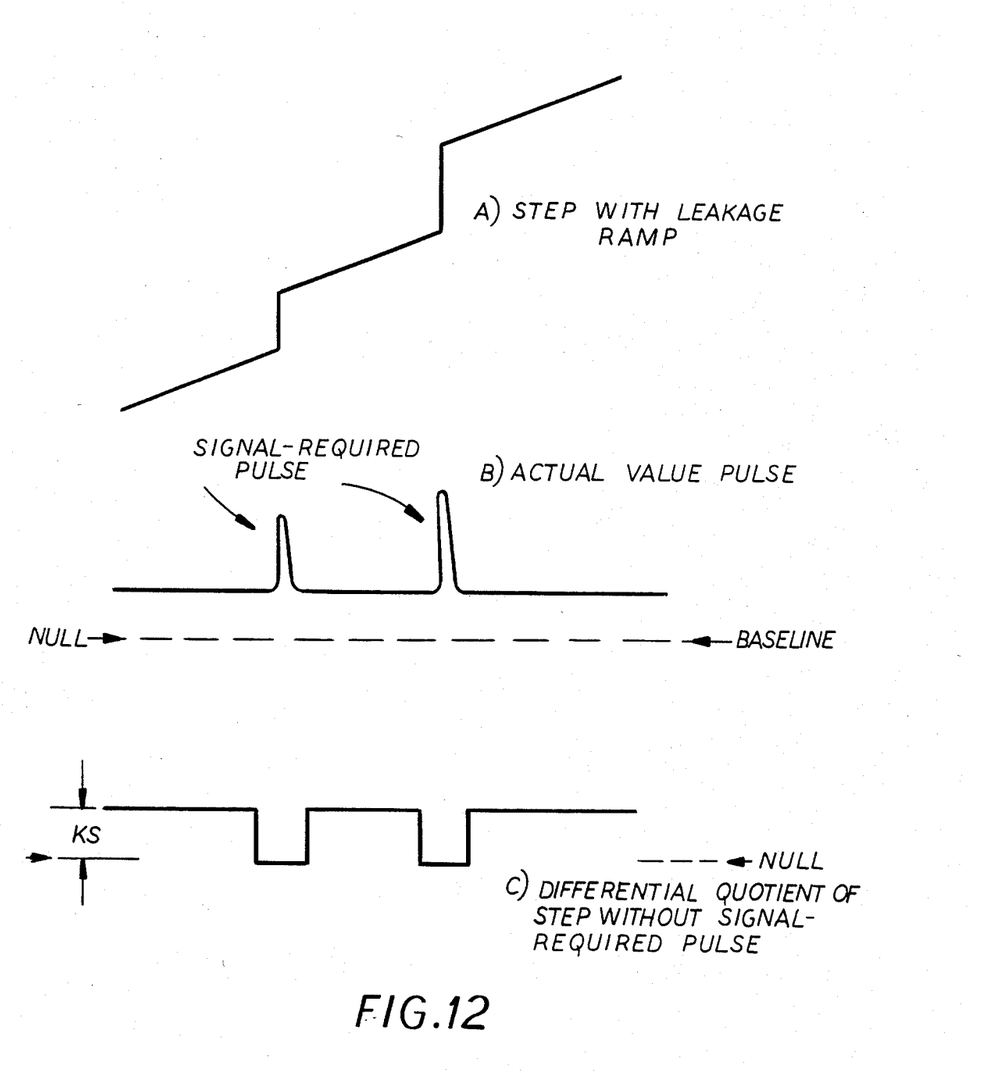
FIG. 12 is a waveform diagram showing the relationship of the waveforms for the circuit of FIG. 11

In practical application of the circuit according to the invention, it has been discovered that in certain cases of high detector loading or where detectors of low quality are employed, the leakage current through the detector is so great that the step function generated by the preamplifier has a ramp shape proportional to the detector leakage current. This has been illustrated somewhat diagrammatically in FIG. 12 in which the graph A shows the step with the leakage ramp while graph B shows the signal required pulse as compared with the actual value pulse corresponding thereto resulting from the ramp effect. It is, therefore, frequently required and is a feature of the invention to correct for this leakage ramp by a feedback which uses as an error signal a differential quotient of the step without the signal required pulse (see graph C of FIG. 12).

Figure 11:
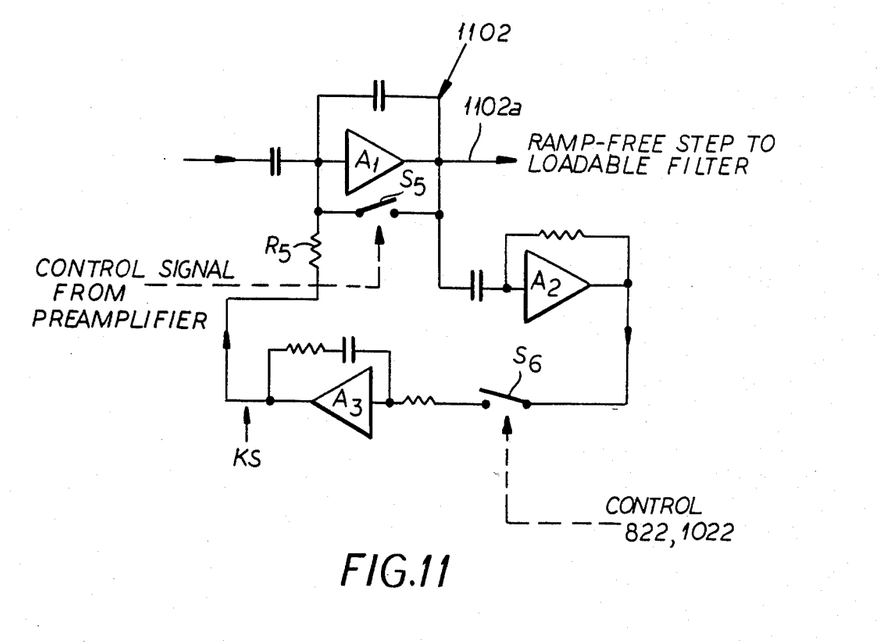
FIG. 11 is a block diagram illustrating a circuit for excluding effect of the slope of the preamplifier step in the manner described.

This can be achieved utilizing a circuit as shown in FIG. 11 and which can be applied to the preamplifier of FIG. 10 or the preamplifier of FIG. 8 in accordance with the invention. The preamplifier, here represented at 1102, can comprise a capacitively fed operational amplifier A1 acting as an inverter and with a nominal amplification factor of unity receiving the step which has the leakage-sensitive ramp from one of the preamplifiers 802 or 1002 and delivering the output to the first amplifier stage 805a or 1005a at 1102a.

The operational amplifier A1 is bridged by a switch S5 which is closed during the resetting time of the preamplifier to bring the operational amplifier to a fixed output value.

Simultaneously, a correcting voltage KS is applied via the resistor R5 so that a correcting current is delivered to the summing point of amplifier A1 which correspondingly reduces the output of this operational amplifier by the rise in the ramp signal. The output of the operational amplifier A1 is also applied to an operational amplifier A2 constituted as a differentiator with the output of the latter representing pulse pauses which can be delivered as the correction signals of graph C of FIG. 12 with a timing controlled by a switch S6 operated by a control signal from the control unit 822, 1022. The control amplifier, also in the form of an operational amplifier A3 generates the correcting voltages KS which are applied to eliminate the leakage current ramps.

I claim:

1. In a method of measuring the energy of a quantum of nuclear of X-ray radiation in which said radiation liberates electric charge by ionization in a detector, the liberated electrical charge which is proportional to the adsorbed energy of the radiation quanta is transformed into energy proportional voltage steps in a preamplifier and the preamplifier output is subjected to filtering in a low-pass filter to reduce the effect of electronic noise from the preamplifier, the improvement which comprises:

(a) before beginning the measurement of a voltage step of a quantum setting a storage element of said low-pass filter at a starting voltage value corresponding substantially to an unfiltered value of the voltage step of the quantum to preload said low-pass filter to an amplitude of signals represented by said quantum;

(b) terminating the measurement of the energy of said quantum no later than the arrival of the next quantum; and (c) forming as the energy-proportional measured value of the quantum a noise-reduced voltage step difference (B−A) by storing a filter output value (A) directly before beginning the measurement of the quantum and subtracting the stored filter output value (A) from the filter output value (B) directly following the termination of the measurement operation.

2. The improvement defined in claim 1 wherein the difference-forming steps between the filter output value (A) directly before the beginning of a quantum measurement and the filter output value (B) directly following the termination of the measuring process for that quantum is effected in one of two parallel and identical operating channels alternately switched for successive quanta such that a value (A) is stored in one of said channels while a corresponding value is used as the value (B) in the other channel and vice versa.

3. The method defined in claim 1 wherein, to eliminate a leakage effect tending to impart a ramp shape to the step function of the output of said preamplifier, a correction signal is generated in timed sequence with the generation of the ramp and is applied to said preamplifier to cancel the ramp effect.

4. An apparatus for the measurement of the energy of quanta of nuclear and X-ray radiation which comprises:

a detector containing a detector material ionizable by nuclear and X-ray radiation for generating electric charge proportional to the energy of impinging quanta of said radiation;

a preamplifier connected to said detector and responsive to the charge generated therein, said preamplifier having a step function and generating a voltage step energy proportional to a quantum of said radiation;

a low-pass filter network including a delay line connected to said preamplifier and having at least one low-pass filter having a storage element, a resistor (R1) in series with said storage element, a first switch (S1) bridged across said resistor, a control unit responsive to the rise of a voltage step at said preamplifier connected to said first switch and maintaining the same closed during the rise of the voltage step and directly thereafter opening said first switch; and at least one difference-forming circuit connected to the low-pass filter provided with said storage element, said difference-forming circuit including a condenser (C2), a second switch (S2) adapted to drain said condenser when said second switch is closed, and an electromotor amplifier connected to said second switch and said condenser, such that a high impedance amplifier of said low-pass filter provided with said storage element applies a value (A) representing a filter output value directly before a quantum measurement and generated when said first switch is open to said difference-forming circuit, and a value (B) representing the filter output value at the end of a voltage step during which said first switch is closed for a quantum of energy to said difference-forming circuit and said difference-forming circuit generates a value (B−A) which is supplied at an output, the switch (S2) being operated by said control unit so as to open immediately before the fall of the voltage step to be measured and closing immediately after the termination of a quantum measurement.

5. The apparatus defined in claim 4 wherein said difference-forming circuit comprises two identical difference-forming channels, each with a respective condenser, second switch and electrometer amplifier, said control unit operating said second switches alternately to close one of said second switches while the other second switch is opened and vice versa, said electrometer amplifiers feeding into a commutation switch alternately connecting them to said output so that the channel operating for subtraction at each instant is connected to said output while the other channel is operating to store a value (A) for a subsequent subtraction.

6. The apparatus defined in claim 4, further comprising means between said preamplifier and said filter network for correcting the voltage step for any ramp-like increase in a voltage step resulting from leakage current applied to the input of said preamplifier.

7. The apparatus defined in claim 6 wherein the last mentioned means includes a capacitively coupled operational amplifier (A1) operating in an inverting mode and having an amplification of at least unity connected between said preamplifier and said network, a third switch (S5) bridged across said operational amplifier and connected to close during a resetting time of said preamplifier, a resistor (R5) connected to a summing point of said operational amplifier (A1) and receiving a correcting voltage (KS) which applies a correcting current to said summing point canceling any ramp effect on the step function at the output of said operational amplifier.

8. The apparatus defined in claim 4 wherein said control unit is connected to said preamplifier by a differentiator in series with a high-speed amplifier and a converter.

9. The apparatus defined in claim 5 wherein said control unit is connected to said preamplifier by a differentiator in series with a high-speed amplifier and a converter.

10. The apparatus defined in claim 5, further comprising zero-point correction feedback means connected to the electrometer amplifier of one of said channels.

11. The apparatus defined in claim 5, further comprising an amplification factor correction means which is connected to one of said channels for matching the amplification factors in said channels.

12. The apparatus defined in claim 5, further comprising feedback means continuously comparing parameters of said channels for maintaining identity in the responses thereof.

* * * * *